US007443167B2

(12) United States Patent  (10) Patent No.: US 7,443,167 B2
Siegel et al. (45) Date of Patent: Oct. 28, 2008

(54) INTERLEAVED MAGNETOMETRY AND PULSED ELECTROMAGNETIC DETECTION OF UNDERGROUND OBJECTS

(75) Inventors: Robert Mark Siegel, West Newton, MA (US); Alan L. Crandall, Palm Harbor, FL (US); Gilbert S. Johnson, Holliston, MA (US)

(73) Assignee: Science Applications International Corporation, San Diego, CA (US)

( * ) Notice: Subject to any disclaimer, the term of this patent is extended or adjusted under 35 U.S.C. 154(b) by 184 days.

(21) Appl. No.: 10/929,730

(22) Filed: Aug. 30, 2004

(65) Prior Publication Data

US 2005/0110496 A1  May 26, 2005

Related U.S. Application Data

(60) Provisional application No. 60/498,501, filed on Aug. 28, 2003.

(51) Int. Cl.
*G01V 3/08* (2006.01)
*G01R 33/02* (2006.01)
(52) U.S. Cl. .................. 324/329; 324/244; 324/259
(58) Field of Classification Search ................. 324/329, 324/345, 349, 248, 253, 262, 244, 259; 361/818; 310/49 R
See application file for complete search history.

(56) References Cited

U.S. PATENT DOCUMENTS 5,025,218 A * 6/1991 Ramstedt ................... 324/334
5,607,205 A * 3/1997 Burdick et al. ............... 299/1.5
5,629,626 A * 5/1997 Russell et al. ............... 324/345

OTHER PUBLICATIONS

Foley, J.E., "Environmental Characterization with Magnetics and STOLS™," Proceedings of the IEEE, Dec. 1994, pp. 1823-1834, vol. 82, No. 12.
"UXO Technology Demonstration at Jefferson Proving Ground, Phase III," US Army Environmental Center, Report SFIM-AEC-ET-CR-97011, Apr. 1997, 326 pages.

* cited by examiner

*Primary Examiner*—Reena Aurora
(74) *Attorney, Agent, or Firm*—King & Spalding LLP

(57) ABSTRACT

Magnetometry and pulsed electromagnetic radiation (EM) may be employed during a same survey pass by synchronously interleaving the collection of magnetometer data with pulses from EM sensors. For example, one or more magnetometers may be sampled between pulses of one or more EM coils such that the data from the one or more magnetometers is substantially free of artifacts from the pulsed EM radiation. A detection system may include a vehicle capable of locomotion over a surface of earth, a mount coupled to the vehicle, the mount including at least one magnetometer, at least one EM sensor adapted to produce pulses of EM radiation, and a controller adapted to interleave collection of data from the at least one magnetometer between the pulses of EM radiation.

4 Claims, 15 Drawing Sheets

INTERLEAVED MAGNETOMETRY AND PULSED ELECTROMAGNETIC DETECTION OF UNDERGROUND OBJECTS

RELATED APPLICATIONS

This application claims the benefit under 35 U.S.C. § 119(e) to U.S. provisional patent application Ser. No. 60/498,501, titled Simultaneous Magnetometry And Pulsed Electromagnetic Detection Of Metallic Objects, filed on Aug. 28, 2003, which is hereby incorporated by reference in its entirety.

BACKGROUND

A number of techniques have been developed that facilitate the detection of various metallic objects (e.g., unexploded ordnance (UXO)) in the subsurface of the Earth, including magnetometry and pulsed electromagnetism (EM). Magnetometry techniques may include using one or more magnetometers capable of sensing magnetic fields. The magnetometers may be employed to measure disruptions in the Earth's magnetic field due to the presence of metallic objects.

Pulsed EM techniques may include one or more pulsed-induction sensors (also referred to as EM sensors or EM coils). The pulse induction sensors may include one or more coils capable of producing and detecting electromagnetic radiation. For example, an electromagnetic pulse may be generated by the one or more coils, inducing a current in conductive materials such as metallic objects. This induced current produces a secondary magnetic field which may be sensed by the one or more EM coils.

In general, magnetometry techniques perform particularly well for deep subsurface objects containing ferrous metals such as iron, steel, etc., while pulsed EM techniques perform well for shallow subsurface objects containing non-ferrous metal such as brass, aluminum, etc.

SUMMARY

In an embodiment of the invention, it is determined whether any subsurface objects are present within a region beneath a surface. An electromagnetic signal is transmitted into the region during a temporal interval. The electromagnetic signal includes a plurality of pulses and, between each of the plurality of pulses, sub-intervals during which the electromagnetic signal is substantially zero or otherwise negligible. Magnetic field information is sampled during at least one of the sub-intervals, where the magnetic field information is indicative of one or more magnetic fields detected by at least one magnetometer during the at least one sub-interval.

In an aspect of this embodiment, a presence of at least one subsurface object within the region is determined, based at least in part on the magnetic field information.

In another aspect of this embodiment, positional information is received, the positional information indicative of a position relative to the region at one or more times during the temporal interval.

In yet another aspect of this embodiment, electromagnetic information is received during the temporal interval, where the electromagnetic information is indicative of electromagnetic radiation detected by at least one sensor from the region during the temporal interval. In another aspect, a visual representation of the region is displayed, including simultaneously displaying information derived from the magnetic field information and information derived from the electromagnetic information. In another aspect, a presence of at least one subsurface object within the region is determined based at least in part on the magnetic field information and/or the electromagnetic information. In yet another aspect, positional information is received during the temporal interval, where the positional information is indicative of one or more positions relative to the region at one or more times during the temporal interval. In another aspect, a presence of at least one subsurface object within the region is determined based at least in part on one or more of the following: the magnetic field information, the electromagnetic information, and the positional information.

In another aspect of this embodiment, the sampling of the magnetic field information from the at least one magnetometer is synchronized based, at least in part, on a synchronizing signal received from an electromagnetic sensor. In another aspect, the sampling of the magnetic field information from the at least one magnetometer is synchronized based, at least in part, on a second synchronizing signal received from a global positioning system.

In yet another aspect of this embodiment, the electromagnetic signal is transmitted by at least one electromagnetic sensor as the at least on electromagnetic sensor moves along the surface of the region. In another aspect, the at least one magnetometer detects the one or more magnetic fields as the at least one magnetometer moves along the surface at a fixed distance from the at least one electromagnetic sensor.

In another embodiment of the invention, a computer-readable medium is provided that stores computer-readable signals defining instructions that, as a result of being executed by a computer, instruct the computer to perform one or more aspects of the method described in the preceding paragraphs.

In another embodiment, a system for determining whether any subsurface objects are present within a region beneath a surface is provided. The system includes at least one electromagnetic transmitter to transmit an electromagnetic signal into the region during a temporal interval. The electromagnetic signal includes a plurality of pulses and, between each of the plurality of pulses, sub-intervals during which the electromagnetic signal is substantially zero or otherwise negligible. The system also includes a controller to sample, during at least one of the sub-intervals, magnetic field information indicative of one or more magnetic fields detected by at least one magnetometer during the at least one sub-interval.

In an aspect of this embodiment, the controller includes means for sampling, during the at least one of the sub-intervals, the magnetic field information from the at least one magnetometer.

In another aspect of this embodiment, the system includes the at least one magnetometer and/or at least one electromagnetic sensor operative to detect electromagnetic radiation from the region during the temporal interval. In another aspect, the system includes a mount on which the at least one electromagnetic sensor and the at least one magnetometer are disposed. In another aspect, one or more of the at least one electromagnetic sensor includes one or more of the at least one electromagnetic transmitter.

In yet another aspect of this embodiment, the controller is operative to receive a first synchronizing pulse from an electromagnetic sensor and to synchronize the sampling of the magnetic field information from the at least one magnetometer based, at least in part, on the first synchronizing pulse. In another aspect, the system includes a mount and a global positioning system disposed on the mount to provide positional information corresponding to the region. The controller is operative to receive a second synchronizing pulse from the global positioning system and to synchronize the sampling of the magnetic field information from the at least one magnetometer based, at least in part, on the second synchronizing pulse.

In another aspect of this embodiment, the system includes a global positioning system disposed on the mount to provide positional information corresponding to the region.

In yet another embodiment, the at least one transmitter is operative to transmit the electromagnetic signal as the at least one transmitter moves across the surface of the region, and/or the system includes the at least one magnetometer, wherein the at least one magnetometer is operative to detect the one or more magnetic fields as the at least one magnetometer moves along the surface at a fixed distance from the at least one transmitter.

In another embodiment of the invention, a system is provided for determining whether any subsurface objects are present within a region beneath a surface. The system includes at least one electromagnetic transmitter to transmit an electromagnetic signal into the region during a temporal interval. The electromagnetic signal includes a plurality of pulses and, between each of the plurality of pulses, sub-intervals during which the electromagnetic signal is substantially zero or otherwise negligible. The system further includes means for sampling, during at least one of the sub-intervals, magnetic field information indicative of one or more magnetic fields detected by at least one magnetometer during the at least one sub-interval.

In yet another embodiment, a system for determining whether any subsurface objects are present within a region beneath a surface is provided. The system includes a mount and at least one magnetometer disposed on the mount, where the at least one magnetometer is operative to detect one or more magnetic fields within the region. The system further includes at least one electromagnetic sensor disposed on the mount, where the at least one electromagnetic sensor is operative to detect electromagnetic radiation from the region.

In an aspect of this embodiment, the system includes a global positioning system disposed on the mount to provide positional information corresponding to the region.

In another aspect of this embodiment, the mount is constructed of materials that do not cause a substantial response in the at least one electromagnetic sensor.

In another aspect of this embodiment, the system includes a locomotive vehicle coupled to the mount, the locomotive vehicle operative to move the mount over the surface.

In another embodiment of the invention, an apparatus is provided. The apparatus includes at least one magnetometer adapted to detect magnetic fields, and at least one electromagnetic sensor adapted to generate pulsed electromagnetic radiation. The apparatus further includes a controller coupled to the at least one magnetometer and the at least one electromagnetic sensor. The controller is configured to sample the at least one magnetometer between pulses of the pulsed electromagnetic radiation.

In an aspect of this embodiment, the controller employs a synchronizing pulse from one of the at least one electromagnetic sensors to synchronize the sampling of the at least one magnetometer.

In another aspect of this embodiment, the apparatus includes a global positioning system device adapted to provide positional data on the location of the apparatus.

In another embodiment of the invention, a detection system is provided. The detection system includes a vehicle capable of locomotion over a surface of earth and a mount coupled to the vehicle. The mount includes at least one magnetometer, at least one electromagnetic sensor adapted to produce pulses of electromagnetic radiation, and a controller adapted to interleave collection of data from the at least one magnetometer between the pulses of electromagnetic radiation.

In an aspect of this embodiment, the controller synchronizes the collection of data based on at least one of the pulses of electromagnetic radiation and pulses from a global positioning system device.

In another aspect, the vehicle and the mount are constructed from materials that do not substantially cause a response in the at least one magnetometer and the at least one electromagnetic sensor, respectively.

Other advantages, novel features, and objects of the invention, and aspects and embodiments thereof, will become apparent from the following detailed description of the invention, including aspects and embodiments thereof, when considered in conjunction with the accompanying drawings, which are schematic and not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

Figure 1:
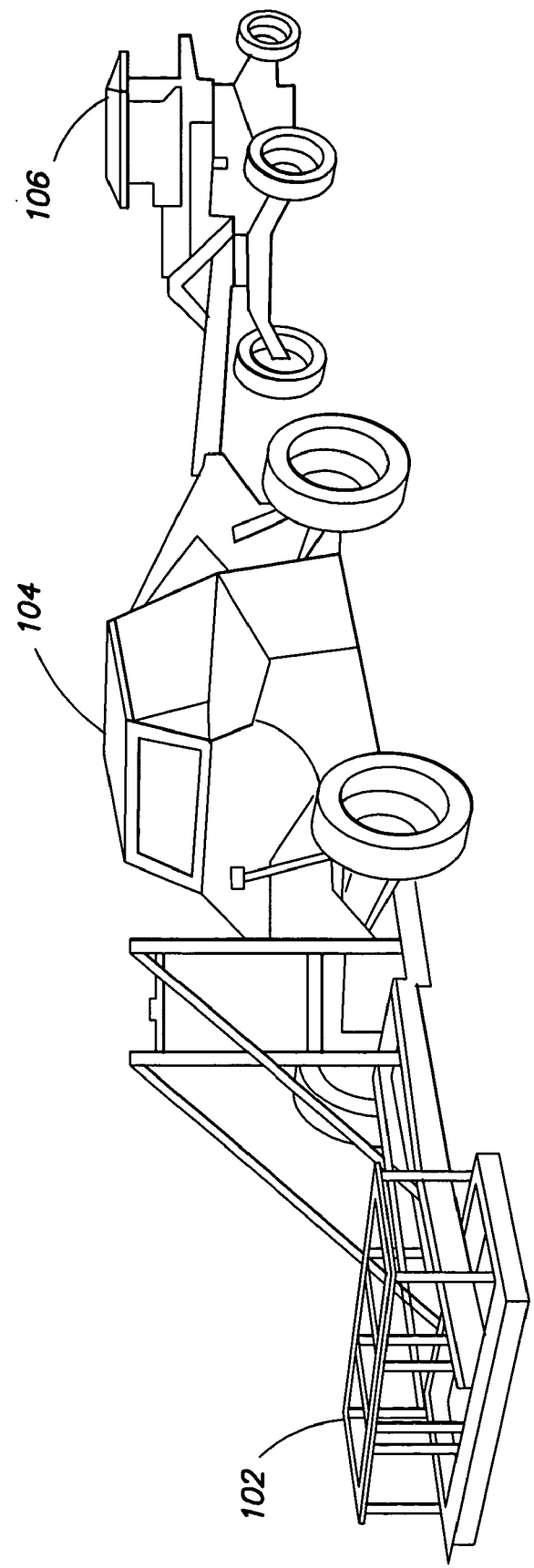
FIG. 1 illustrates a magnetometer/EM system using a front-mounted EM and rear-mounted magnetometers ("push/pull") for maximum separation.

The complimentary performance characteristics of magnetometry and pulsed EM techniques may provide a robust method of detecting various objects of interest, for example, UXO in the Earth's subsurface. In conventional detection systems, however, the two techniques may perform unsatisfactorily when performed simultaneously, for example, during a survey pass in which both pulsed EM data and magnetometry data are collected simultaneously from a subterranean region. In particular, signals transmitted by EM coils disrupt the operation of the magnetometers, that is, the signals are detected as noise by the magnetometers. Typically, the disruption is severe enough that data obtained from the magnetometers is not useable for detecting objects of interest as intended.

Applicant has identified and appreciated that magnetometry detection and pulsed EM detection may be performed during a same survey pass of a region (e.g., a subterranean region) by interleaving the collection of magnetometer data with pulses from the EM sensors. For example, one or more magnetometers may be sampled between pulses of one or more EM coils such that the data from the one or more magnetometers is substantially free of artifacts from the pulsed EM radiation. The sampling of EM data between pulses may be synchronized, for example, using a synchronized signal from an EM sensor, a synchronizing signal from a global positioning system (GPS) device, or a combination thereof, as is described in detail below.

Following below are more detailed descriptions of various concepts related to, and embodiments of, methods and apparatus according to the present invention. It should be appreciated that various aspects of the invention, as discussed above and outlined further below, may be implemented in any of numerous ways, as the invention is not limited to any particular manner of implementation. Examples of specific implementation are provided for illustrative purposes only, to facilitate a better understanding of the invention and illustrate the benefits thereof, but do not exemplify the full scope of the invention. For example, although several embodiments of the invention are described in relation to interleaving the collection of magnetometer data with pulses from an EM sensor during a survey pass, the invention is not so limited. Such interleaving may be performed independent of a survey pass, for example, by a system that is not in motion during the pulsing and sampling. Further, aspects of the invention are not limited to being implemented only for magnetometer data and EM pulses, but may be implemented for other types of data and/or pulses.

EXAMPLES

As discussed above, because of the unique strengths of each of magnetometry and pulsed EM techniques, a system that applies both techniques on a region would increase the probability of detecting objects of interest in the region. Operating both sensors simultaneously in close proximity, however, normally produces unsatisfactory data due to the interference caused by the signal that is output from the pulsed-induction sensor. This signal is detected as noise by the magnetometer. Normally, this noise is severe enough that two sensors cannot be operated within approximately thirty feet of each other without corrupting the data collected by the magnetometer.

Various aspects of the present invention address this interference problem by interleaving (e.g., using custom-built electronics) the sampling of data from magnetometers between the pulses from the pulsed-induction sensors, i.e., sampling the magnetometers when the pulsed-induction sensors are not radiating. This interleaving allows magnetometer and pulsed induction data to be collected during a same survey pass such as of a region, using a single mount such as, for example, a single, rigid, towed platform. Such interleaved, single-mount detection using a single mount may decrease the cost of performing geophysical surveys, and may yield data from which it is more likely to detect objects of interest than it would be from EM or magnetometry data alone.

Various systems for detecting objects of interest using magnetometry techniques have been described. For example, U.S. Pat. No. 5,629,626 (the '626 patent) titled "Apparatus and method for measuring buried ferromagnetic objects with a high accuracy of position and in synchronization with a sync pulse provided by a global positioning system," to Russell et. al describes, inter alia, a Surface Towed Object Location System (STOLS) using magnetometry and global positioning system (GPS) technology. The '626 patent is hereby incorporated by reference in its entirety.

The system described in the '626 patent employs a single-sensor (magnetometer-only) towed array that achieves precise sensor-to-GPS synchronization by triggering the acquisition of magnetometer data with the one-pulse-per-second (one-PPS) signal from the GPS. Various aspects of the present invention include utilizing both magnetometers and pulsed electromagnetic sensors, triggering the acquisition of magnetometer data not only with the one-PPS signal, but the one-PPS signal followed by the first pulse from the pulsed EM system.

In addition, the STOLS in the '626 patent was developed to provide a low-noise environment in which to collect magnetometer data. Various aspects of the present invention include providing a low-noise environment in which to collect both magnetometer and pulsed EM data on a single towed platform.

A detection system according to the present invention may include both commercial-off-the-shelf (COTS) components and custom components integrated into the system. Alternatively, the system may include all custom components or all COTS components. The system may include any of the following components (some examples of which are shown in FIGS. 1-10B and 14): a towing vehicle, such as a specialized dune buggy, which may be constructed primarily out of one or more materials (e.g., aluminum) that provide(s) a low self-signature to the magnetometers: a towed platform made out of one or more materials (e.g., fiberglass) that provide(s) a low metallic self-signature to both the magnetometers and the pulsed-inductor sensors; a differential Global Positioning System (GPS) such as, for example, a commercial off-theshelf (COTS) GPS; a plurality (i.e., two or more) of magnetometers (e.g., five COTS total field magnetometers); a plurality of pulsed induction coils (e.g., five COTS pulsed-induction coils); a Magnetometer Period Counter (MPC) board and related electronics that interleave the magnetometer and pulsed EM data so they don't interfere with each other; software that controls the electronics; software that controls the simultaneous display of magnetometer and EM data; a display device (e.g., a computer monitor) to simultaneously display the magnetometer and EM data; other components; and any suitable combination of the foregoing components. It should be appreciated that the system can be made from a variety of component parts and materials and that the inventions is not limited by the particular components, choice of materials, or arrangement of parts.

A towing vehicle constructed mostly from aluminum may be desirable because the magnetometers are extremely sensitive, and detect metal containing iron or steel. To tow the magnetometers behind a conventional vehicle such as a Jeep® may create an unacceptably strong and noisy magnetic signature from the vehicle that would compromise magnetometer data quality. Aluminum or various other non-ferrous materials may be used to provide a vehicle having a reduced or negligible magnetic signature. The pulsed-induction sensors detect all metals, including aluminum, but if arranged properly, the pulsed-induction sensors may not be responsive to the aluminum vehicle because their sensitivity falls off much faster with distance than the magnetometers. However, if, as in some embodiments, the pulsed-induction sensors are mounted directly on the towed platform, and the towed platform is constructed from aluminum, an unacceptably strong and noisy signature may be detected by the EM sensors, which would compromise EM sensor data quality. Thus, the platform 102 may be constructed almost entirely from fiberglass with, for example, joints reinforced with marine-grade plywood.

FIG. 1 illustrates one embodiment of a detection system that may overcome the problem of EM coil interference with magnetometers. The system mitigates the EM-induced interference on the magnetometers by physically separating the two sensors by the maximum separation distance practical on a survey vehicle. The survey vehicle includes locomotive vehicle 104, a rear-mounted towed platform 106 to host the magnetometers, and a front-mounted platform 102 to host the EM array. This "push-pull" system may be functional, but because of the nearly thirty-five foot sensor-to-sensor separation, tends to be extremely ungainly to drive in real-world geophysical surveying. Further, because the sensors are not located on the same mount, such as a fixed, rigid platform, the data from each sensor needs to be independently positioned, necessitating the use of a GPS for each sensor and adding unnecessary cost and complexity.

Figure 2:
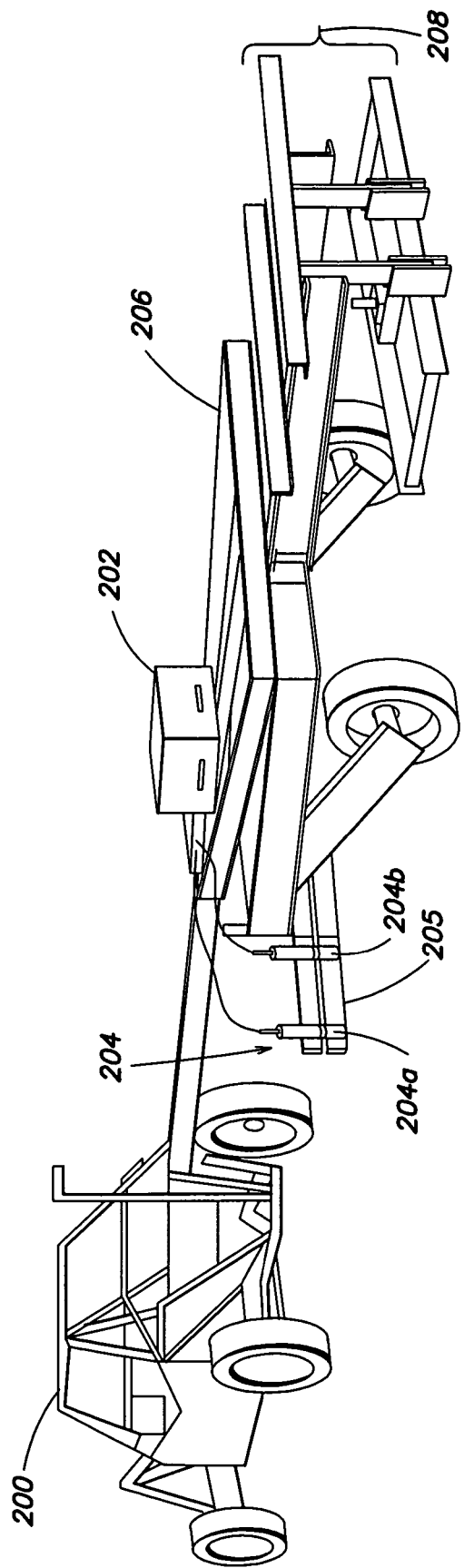
FIG. 2 illustrates one embodiment of a geophysical survey system for interleaved pulsed-induction and magnetometer detection according to the present invention.
Figure 3:
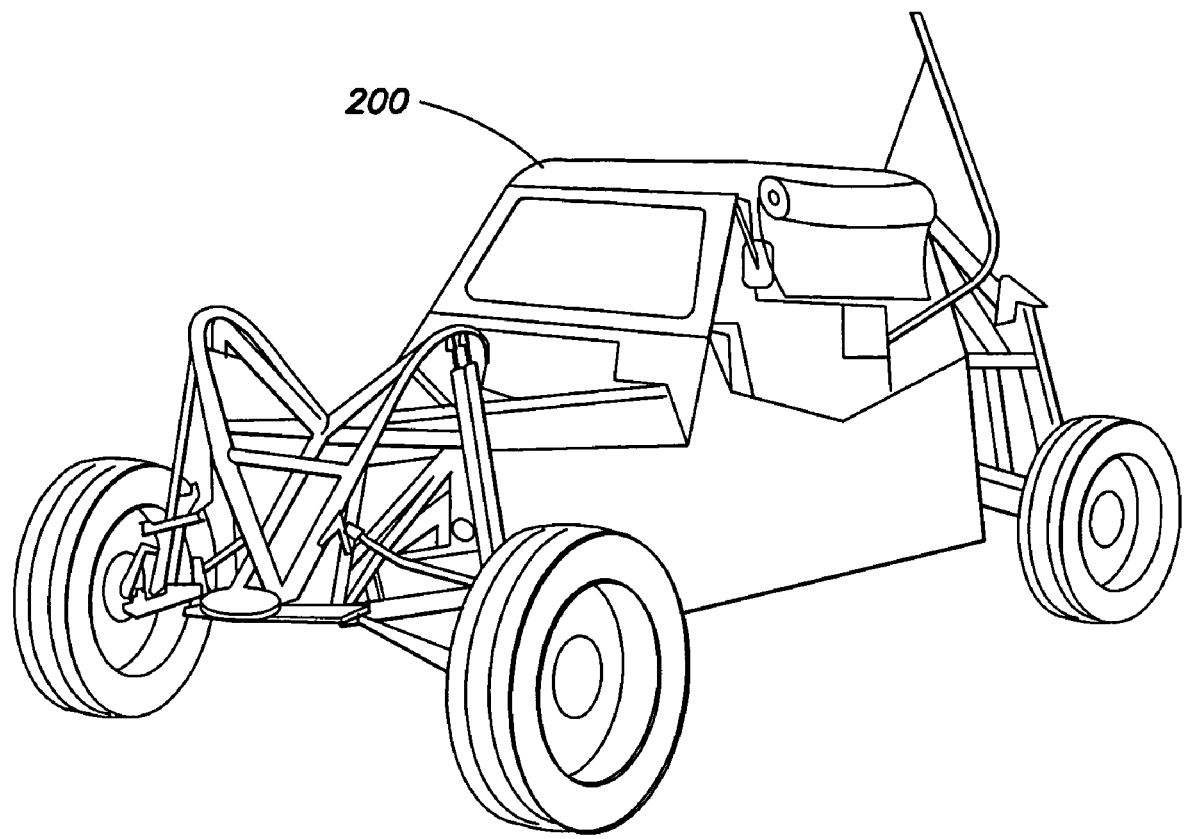
FIG. 3 illustrates one embodiment of a towing vehicle, constructed mostly from aluminum according to the present invention.

FIG. 2 illustrates one embodiment of a geophysical survey system for interleaved pulsed-induction and magnetometer detection according to the present invention. The system may include any of: towing vehicle 200, a towed platform 206, magnetometer array 204, components housing 202 and EM sensor array 208. The towing vehicle 200 (shown in a perspective view in FIG. 3) may be any of a variety of types of vehicles, such as a specialized dune buggy. The towing vehicle 200 may be constructed primarily out of one or more materials (e.g., aluminum) that provide(s) a low self-signature to the magnetometers so that the towing vehicle does not interfere with the detection of or more magnetic fields by the magnetometers.

Figure 4:
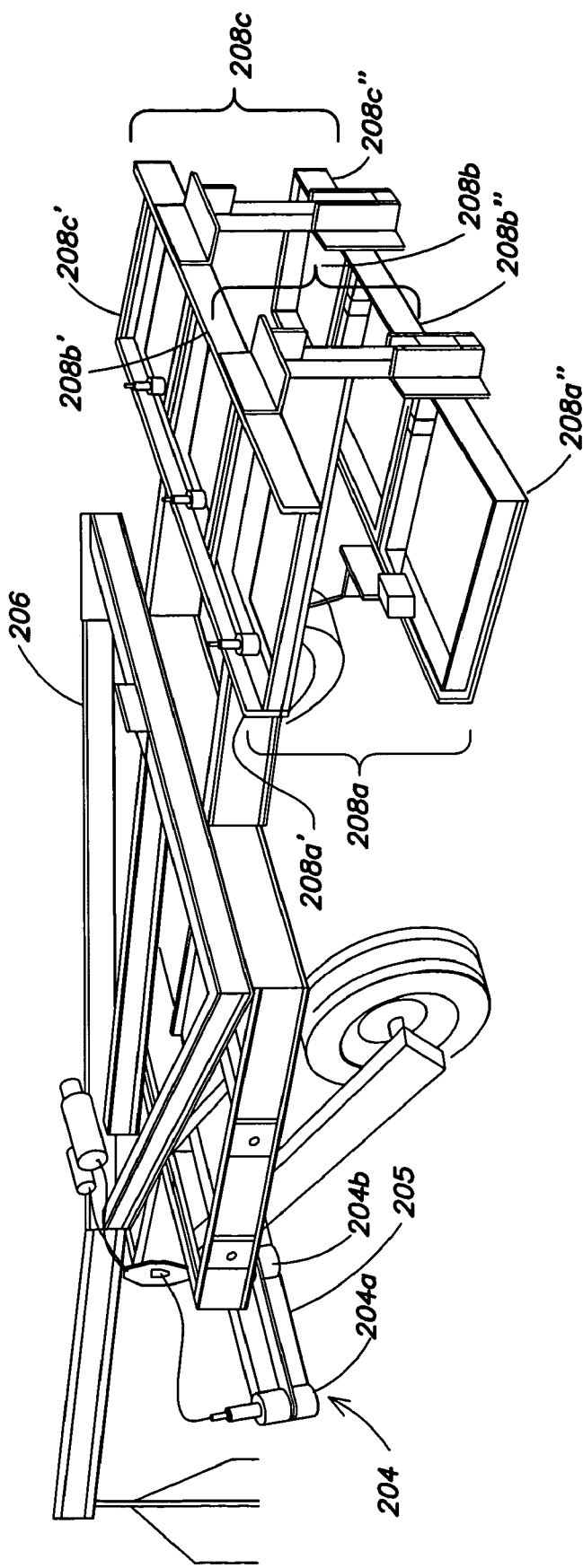
FIG. 4 illustrates one embodiment according to the present invention of a towed multi-sensor platform constructed mostly from fiberglass with COTS magnetometers and COTS EM coils.

FIG. 4 is a perspective view of the towed platform 206, having mounted thereon a magnetometer array 204, EM sensor array 208 and components housing 202. Magnetometer array 204 may include a plurality of magnetometers. In FIGS. 2 and 4, only two magnetometers 204a and 204b are shown, but it should be appreciated that one or more (e.g., three) other magnetometers (hidden from view in FIG. 4) may be included in the array 204. In some embodiments, only one magnetometer may be included. The EM sensor array 208 may include one or more pulsed-induction coils, for example, three coils 208a-208c. Each coil may include a coil in an upper level and a coil in a lower level as shown in FIG. 4. Thus, coil 208a may include upper coil 208a' and lower coil 208a", coil 208b may include upper coil 208b' and lower coil 208b", and coil 208c may include upper coil 208c' and lower coil 208c". As is known in the art, such a bi-level coil design may assist in estimating the depth beneath a surface of detected objects. It should be appreciated, however, that the invention is not limited to such a bi-level design, as only a single level of EM coils may be used. Further, it should be appreciated that the invention is not limited to the use of three coils, as any number of coils may be included in array 208, for example, one coil or five coils as is shown in FIG. 6.

Figure 5:
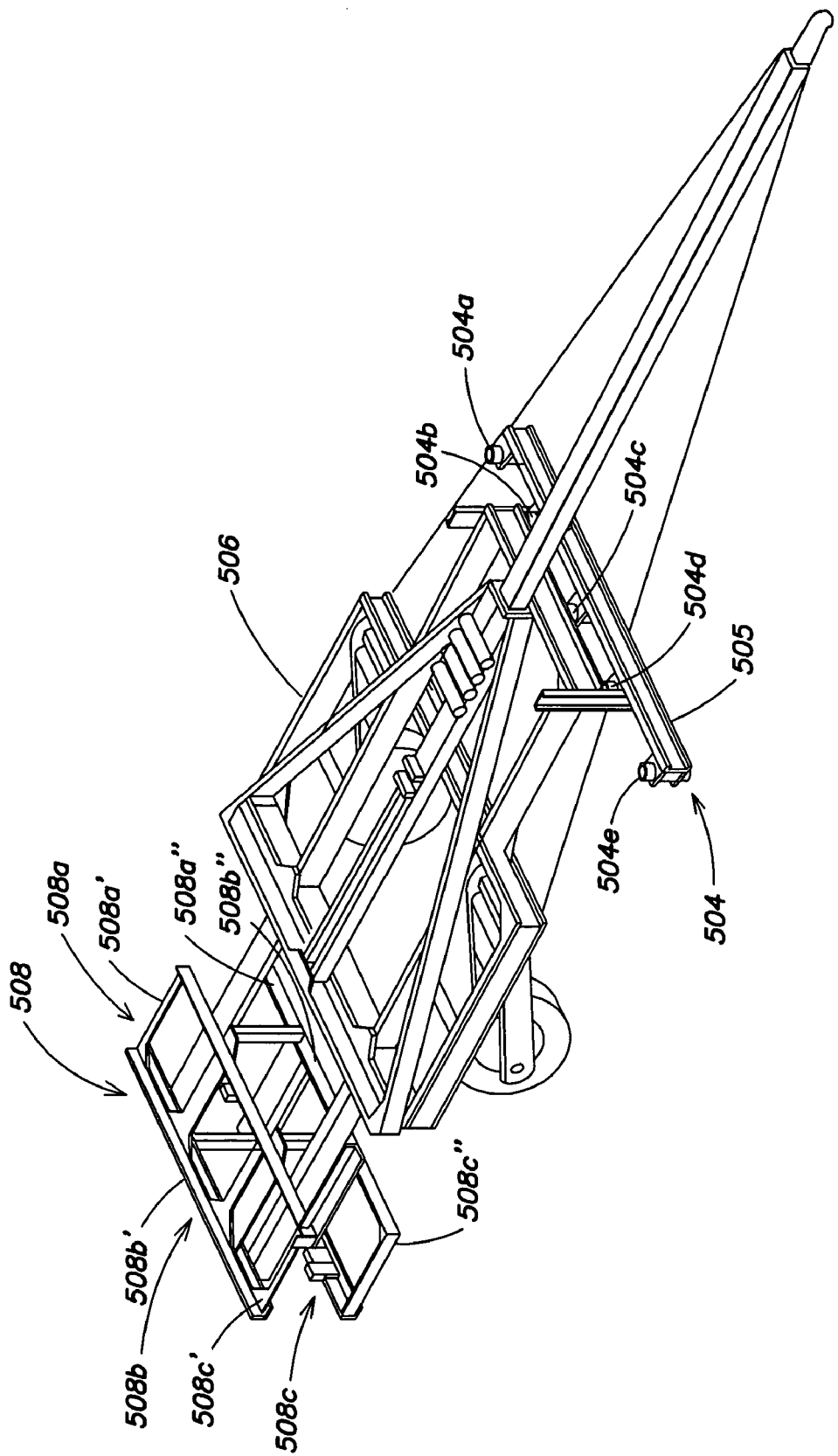
FIG. 5 illustrates a perspective view of one embodiment according to the present invention of a platform operating as a single mount for a detection system including both magnetometry and pulsed EM.

FIG. 5 illustrates a perspective view of a towed platform 506, including magnetometer array 504, which may include five magnetometers 504a-504e, and EM sensor array 508, which may include three EM coils 508a-508c in a bi-level arrangement.

Figure 6:
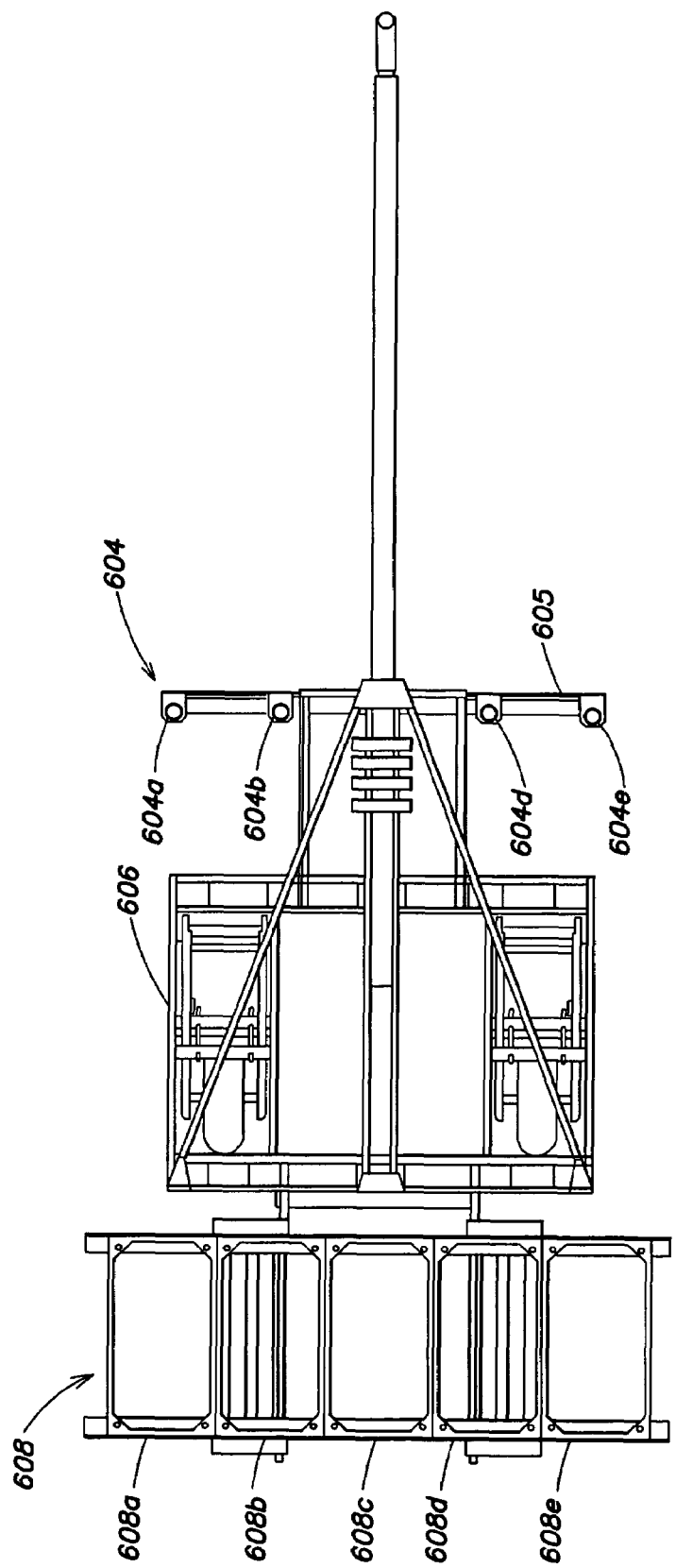
FIG. 6 illustrates a plan view of one embodiment according to the present invention of a platform operating as a single mount for a detection system including both magnetometry and pulsed EM.
Figure 7:
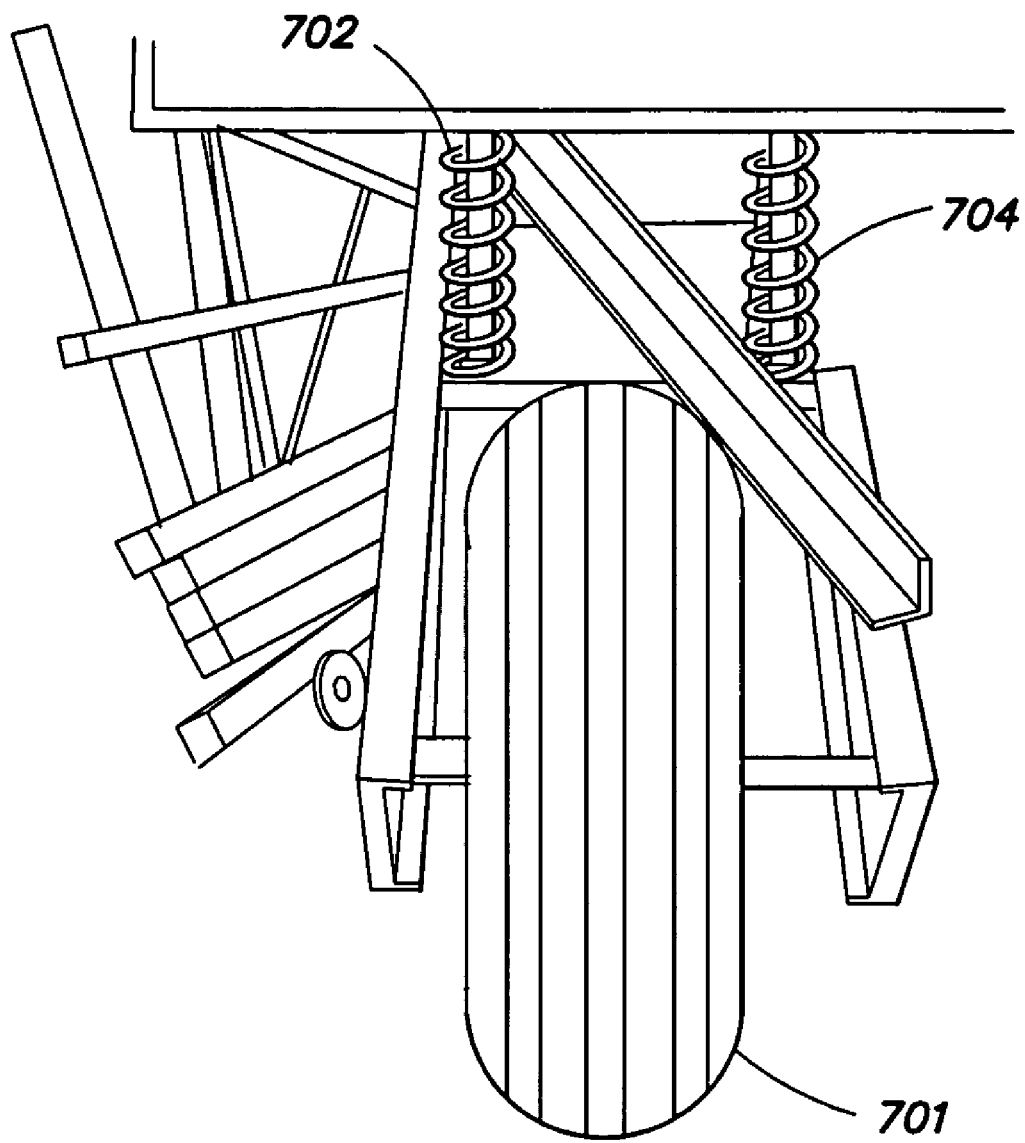
FIG. 7 illustrates one embodiment according to the present invention of a portion of a platform, including a wheel, operating as a single mount for a detection system including both magnetometry and pulsed EM.

FIG. 6 illustrates a plan view of a towed platform 606. Similar to platforms 206 and 506, platform 606 may include a magnetometer array 604 including five magnetometers 604a-604e. Platform 606 also may include an EM sensor array 608 including five coils (608a-608e). Coils 608a-608e may include an upper and lower coil, similar to coils 208 and 508, or may include only a single level of coils. An EM sensor array having five pulsed-induction coils, such as array 608, may be used as part of the geophysical survey system illustrated in FIG. 2.

Any of platforms 206, 506 and 606 may be constructed of over 99% of one or more materials (e.g., non-metallic materials such as, for example, fiberglass) that provide(s) a low metallic self-signature to both the magnetometers and the pulsed-inductor sensors. Frame members may be channel fiberglass, with structural pieces reinforced with marine plywood. Platform components may be glued together and reinforced lightly with rivets (preferably at suitable distances from the EM coils). The wheels may be composite, having metal (e.g. stainless steel) axles. A magnetometer boom (e.g., 205, 505 or 605) may be designed to hold any number of magnetometers. For example, a number (e.g., five) of magnetometers may be arranged such that they are aligned with centers of a number (e.g., five) of EM coils to facilitate co-locating the sensors. The EM coils may be hosted on the rear of the platform as shown in FIGS. 2, 4, 5 and 6, or, alternatively, on a platform mounted in front of the towing vehicle, as shown in FIG. 1.

EM coils may respond to various metal materials. Accordingly, a metallic mount may interfere with the operation of the coils. While it is possible to construct a platform using metal and providing the EM coils on a cantilever separated from the metal platform by some desired distance, it may be preferable to constructed a mount, for example, a towed platform (e.g., any of platforms 106, 206, 506 or 606) constructed essentially of non-metallic material. In addition, the relationship between the magnetometers and the EM coils may affect the efficacy of the acquisition.

For example, if an array of EM sensors are too close to an array of magnetometers, the EM sensor array may drive the magnetometers into saturation and the magnetometers' recovery time might be longer than could be accommodated even with interleaved sampling. Applicants have recognized that by separating the EM coils and the magnetometers, the problems associated with magnetometer saturation can be reduced or eliminated. For example, experiments were conducted where EM coils were positioned behind (e.g., with respect to a tow vehicle) the magnetometers and moved back to thirteen feet in one-foot increments. The remnant noise effect caused by saturation was initially very large when the EM coils were very close to the magnetometers. Eight feet appeared to be the minimum reliable sensor separation distance. At this distance the remnant noise appeared to be less than one gamma. At each position, the delay was varied from eight ms to five ms in steps of one ms. Accordingly, Applicant has developed a towed platform having EM coils disposed proximate to the magnetometers at a distance that may be adjustable so as to achieve a desired separation. For example, the EM coils may be arranged such that they can be adjusted to a position anywhere from eight to ten feet distant (e.g., behind) the magnetometers. Subsequent study with the resulting interleaving electronics has shown these numbers to be conservative. Sensor separations of four feet may be feasible with interleaving electronics, possibly even less if the timing of the pulsed EM system is modified to allow the magnetometer more time to recover from saturation.

The towed platform (e.g., 206, 506 or 606) of the system may include any of a variety of features for making the platform more rugged and durable. For example, the structure holding the EM sensor array may be configured to be capable of swinging back (e.g., rotating upward from a surface over which the platform is moving) in response to striking an obstacle on a surface. The EM-coil structure may include a shock absorber (e.g., a pneumatic shock absorber) that dampens the motion of the EM-coil structure when it swings forward (back into place after swinging back) so that the EM sensor array structure does not slam into the frame of the platform, which could cause damage to the platform or EM sensors. Further, each wheel of the platform may include a suspension system such as, for example, the titanium springs 702 and 704 shown in FIG. 7 for wheel 701. The platform also may include cross-braces to stiffen the trailing arms of the platform, and the wheelbase of the platform may be increased (e.g., by moving the wheels outboard on the axel) to add stability to the platform.

Figure 8:
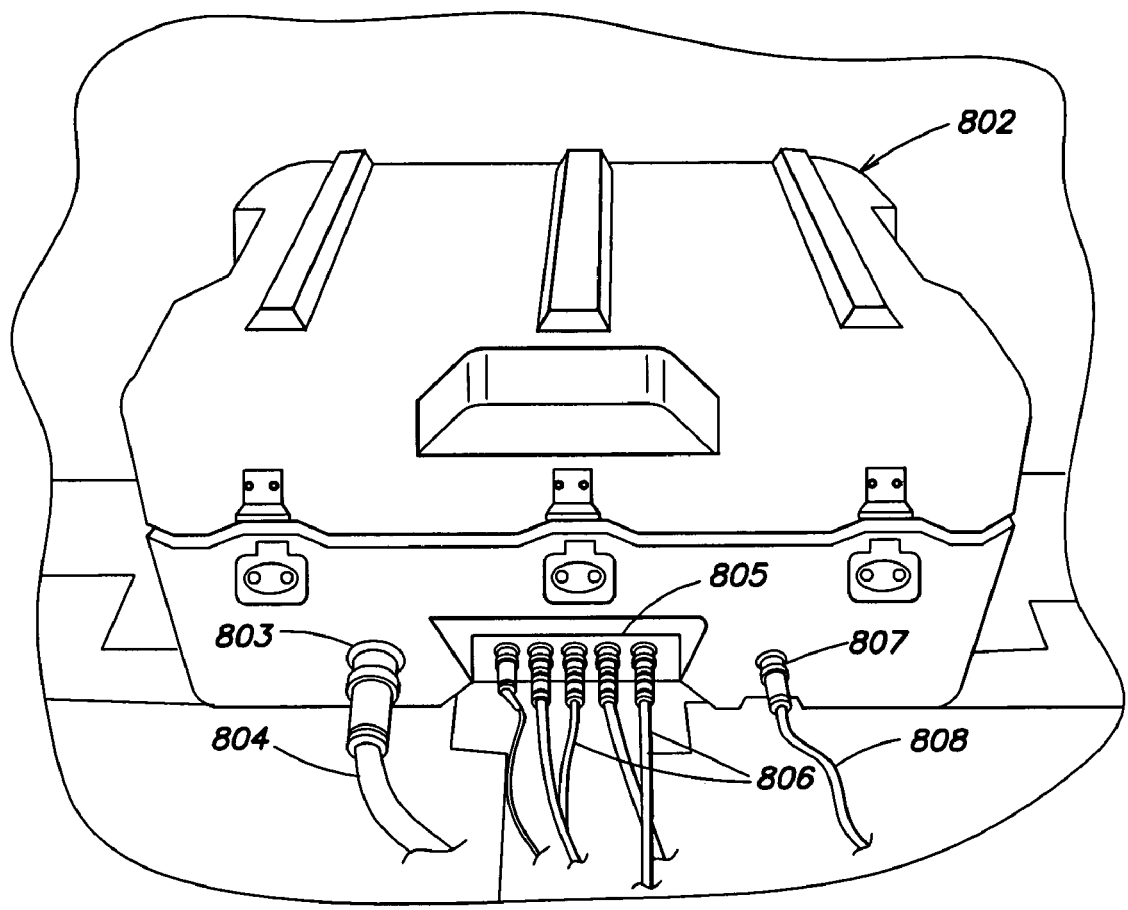
FIG. 8 illustrates one embodiment of a housing for one or more components of a geophysical survey system according to the present invention.
Figure 9:
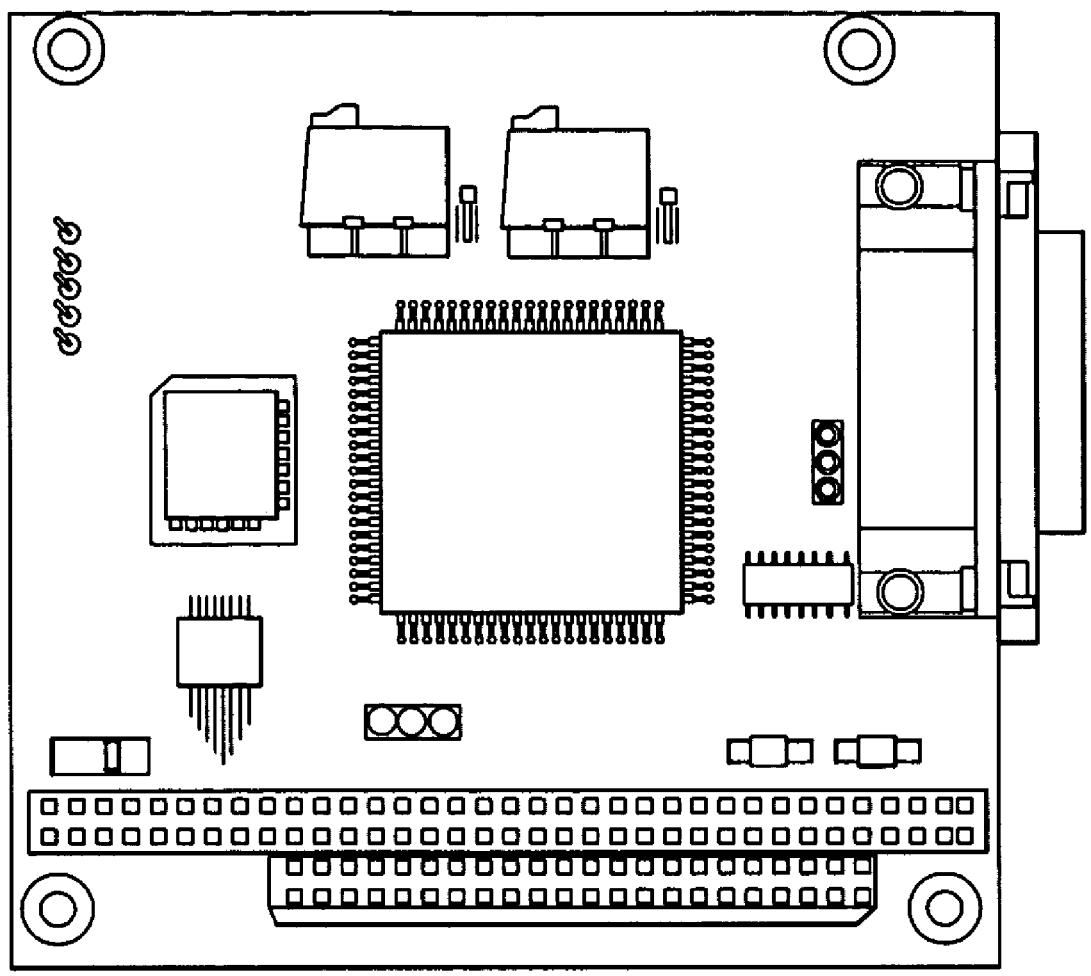
FIG. 9 illustrates one embodiment according to the present invention of a magnetometer period counter (MPC) board that interleaves magnetometer and EM information.

FIG. 8 illustrates an example of a housing 802 (e.g., housing 202 of FIG. 2) which may be mounted on the platform, and which may house one or more components of the geophysical survey system. For example, housing 802 may include one or more electronic hardware and software components, including an MPC board and related electronics (e.g., the custom MPC board and related electronics shown in FIG. 9) that interleave magnetometer and pulsed EM data so that they don't interfere with each other. The housing 802 also may include software that controls the electronics, and software that controls the simultaneous display of magnetometer and EM data. It should be appreciated that one or more components described herein as being housed within housing 802 alternatively may be housed within towing vehicle 200.

Housing 802 may have a variety of connections and interfaces for interfacing with one or more other components of the system described herein. For example, housing 802 may have a multi-pin cable interface 803 for interfacing with multi-pin cable 804. Cable 804 may carry power, a one-PPS sync signal from a GPS, and data to/from a computer located in towing vehicle 200. Alternatively, the computer may be located within housing 802, such that an external connection to the computer is not necessary. Housing 802 also may include magnetometer interfaces 805 which interface to magnetometer cables 806 from which magnetometer data may be signaled from magnetometers, as described below in more detail. Further, housing 802 may include a synchronization interface 807 for interfacing with a synchronization cable 808 operative to carry a synchronization signal, for example, a seventy-five Hz synchronization signal from an EM sensor, which is described below in more detail. Housing 802 may include other connections and interfaces, for example, a connection to receive EM data from one or more EM sensors. The connections and interfaces included in housing 802 may depend on which components of the system are located in housing 802 and which are located in the towing vehicle.

Figure 10A:
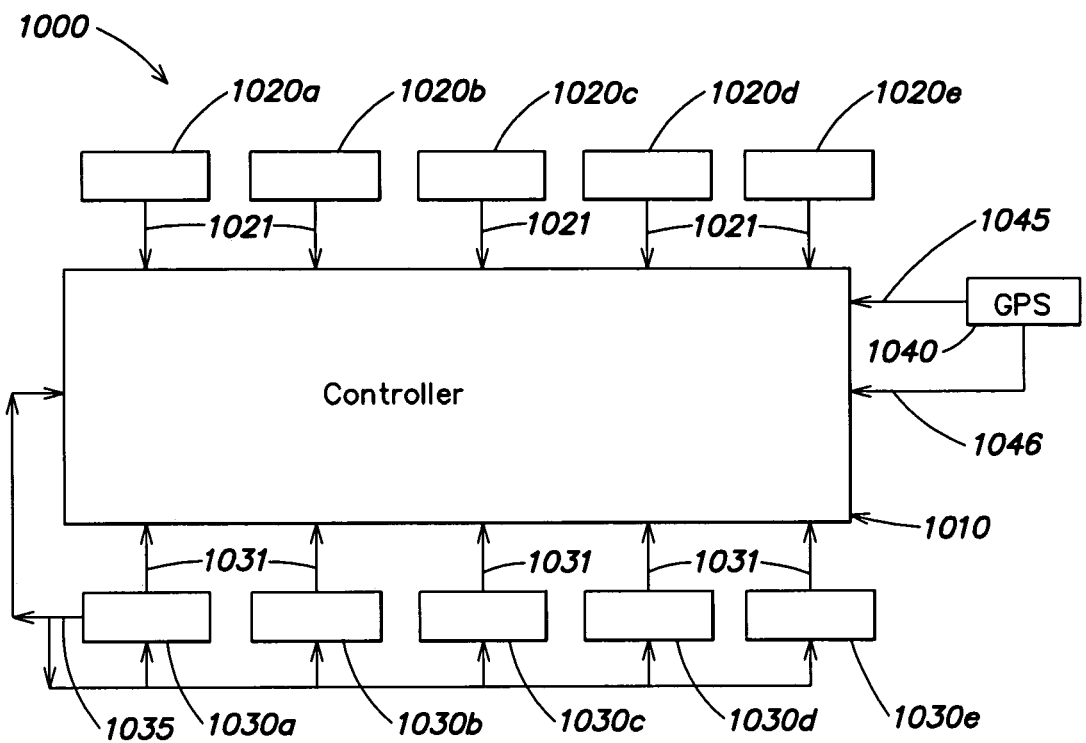
FIG. 10A illustrates a block functional diagram of one embodiment of a system for acquiring interleaved magnetometer and EM information over a period of time according to the present invention.

FIG. 10A is a block diagram illustrating one embodiment according to the present invention of an acquisition system 1000 for obtaining interleaved data from magnetometers and EM sensors. Acquisition system 1000 may include any of a plurality of magnetometers 1020a-1020e and a plurality of EM sensors 1030a-1030e. Sensors 1020a-1020e and sensors 1030a-1030e may be coupled to a controller 1010. Controller 1010 may be implemented in any number of ways and may include various general purpose and/or dedicated components. For example, controller 1010 may be implemented as dedicated hardware (e.g., various circuitry, programmable logic arrays, etc.) designed and/or configured to perform any of one or more of a variety of functions described herein, and/or may be implemented as one or more microcomputers or processors (e.g., microprocessors) that are programmed to perform any one or more of the variety of functions described herein, or any combination of the above.

Controller 1010 may be adapted to receive data signals 1031 from at least one of the sensors 1030a-1030e. Sensors 1030a-1030e may be configured to receive a first synchronizing (sync) pulse 1035 that triggers the emission of the EM pulse used to detect objects of interest. This first sync pulse 1035 may be generated by one of sensors 1030a-1030e (e.g., 1030a). Each of sensors 1030a-1030e may include a transmitter to transmit an EM pulse or may otherwise be configured to emit an EM pulse. Controller 1010 may be coupled so as to receive the first sync pulse 1035. Although FIG. 10A shows a shared connection between sensors 1030a-1030e and controller 1010 over which the first sync pulse 1035 is provided, it should be appreciated that the invention is not so limited. The first sync pulse may be provided over a plurality of connections from the sensor providing the sync pulse to the other sensors and the controller, each connection being between the sensor providing the sync pulse and one or more other sensors and/or the controller 1010. Controller 1010 also may be coupled to a GPS 1040 and adapted to receive a second sync pulse 1045, for example, the 1 pulse per second (1 PPS) transmitted by the GPS. Controller 1010 also may be configured to receive position information 1046 from GPS 1040. In addition, controller 1010 may be coupled to sensor 1020a-1020e in order to sample at least one of the sensors 1020a-1020e.

Controller 1010 may employ the first sync pulse 1035, the second sync pulse 1045 or both in order to sample sensors 1020a-1020e at a desired interval. As discussed above, it may be desirable to sample magnetometers during intervals when EM sensors aren't generating signals that cause the magnetometers to respond erroneously. Accordingly, controller 1010 may use the first sync pulse 1035 as an indication of when one or more of sensors 1030a-1030e are generating electromagnetic radiation. Controller 1010 then may wait for a predetermined period such that the EM pulse from the sensor 1030a-1030e may decay to a level causing a tolerable or negligible response in sensors 1020a-1020e. Controller 1010 may then sample one or more of sensor 1020a-1020c to obtain data 1021 from the sensors uncorrupted by signals generated by sensors 1030a-1030e.

In addition, controller 1010 may use the second sync pulse from the GPS to further synchronize sampling of sensors 1020a-1020e with position information 1046 from the GPS 1040 as described in further detail below. It should be appreciated that any number of sensors 1020 and 1030 in any combination may be used and the invention is not limited to the number illustrated herein.

Figure 10B:
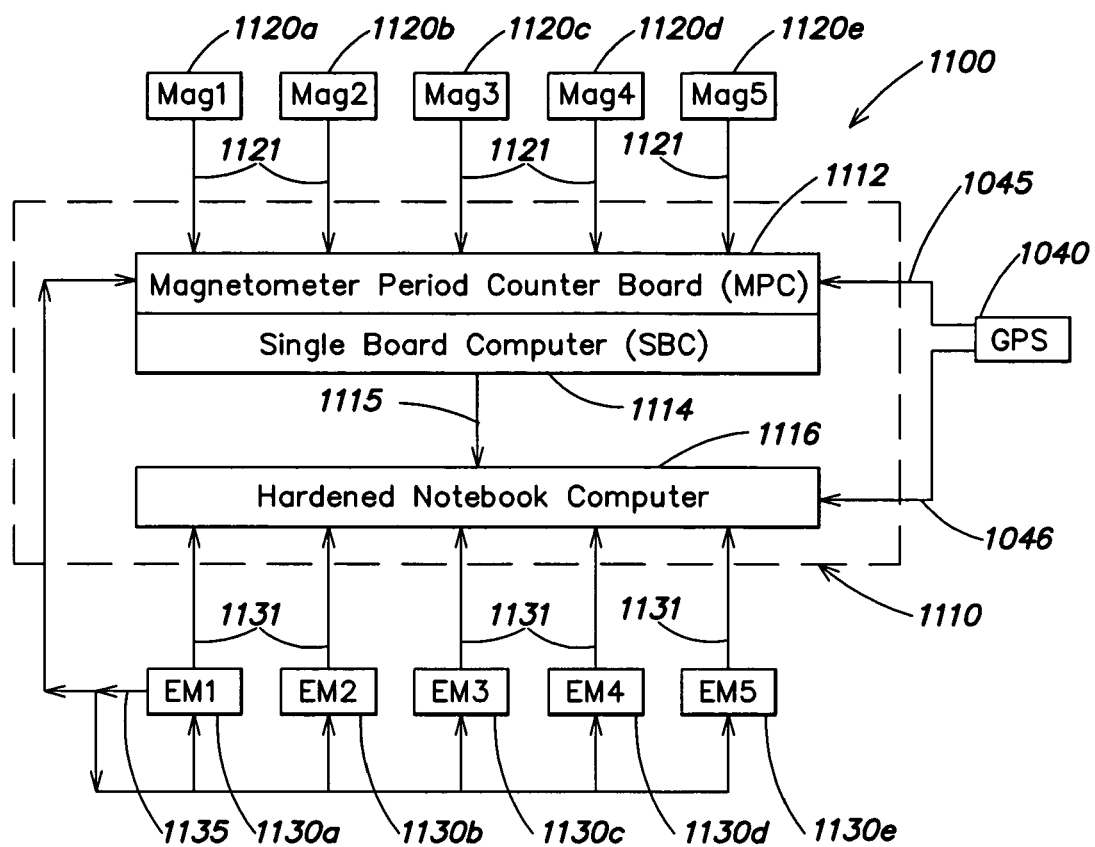
FIG. 10B illustrates a block functional diagram of one embodiment of a system for acquiring interleaved magnetometer and EM information over a period of time according to the present invention.

FIG. 10B is a block diagram illustrating a system 1100, which is one embodiment of system 1000 according to the present invention. Other embodiments of system 1100 may be used. Acquisition system 1100 may include five magnetometers 1120a-1120e and a number of (e.g., five) EM sensors 1130a-1130e. The magnetometers used may be Geometrics 822A total field magnetometers, though any total field magnetometer with a frequency-based output could be used. The EM sensors used may be industry-standard Geonics EM61 units that sample EM radiation at one point during the decay curve of an EM pulse (e.g., 1204 in FIG. 12), or Geonics EM61 MK2 ("mark 2") units available from Geonics, which sample EM radiation at four points during the decay curve of an EM pulse. Other types of EM sensors may be used.

The EM sensors may be configured in a master-slave mode where the transmitter in one of the EM sensors 1130a-1130e (e.g., sensor 1130a) generates a first sync pulse 1135 (e.g., a seventy-five Hz pulse), which triggers the transmitters in the other EM sensors so the sensors act synchronously as an array. This sync pulse also may be fed to the Magnetometer Period Counter (MPC) board 1112 and used for synchronization. The MPC board 1112 may sample magnetometer data 1121, and may be hosted by a Single Board Computer (SBC) 1114 running embedded MS-DOS or any other suitable architecture or operating system. Although FIG. 10B shows a shared connection between sensors 1130a-1130e and controller 1110 over which the first sync pulse 1135 is provided, it should be appreciated that the invention is not so limited. The first sync pulse may be provided over a plurality of connections from the sensor providing the sync pulse to the other sensors and the controller, each connection being between the sensor providing the sync pulse and one or more other sensors and/or the controller 1110.

Controller 1110 also may include an environmentally-hardened notebook computer 1116 (e.g., a PGI Nightingale), which may run custom data acquisition software such as, for example, software developed for the Windows® operating system. The hardened notebook computer 1116 may be configured to acquire magnetometer data 1115 from the SBC 1114 via a serial interface such as, for example, an RS422 interface. The hardened notebook computer 1116 further may be configured to acquire position information 1046 from GPS 1045 and/or electromagnetic data 1131 from one or more of EM sensors 1130a-1130e. Position information 1046 and EM data 1131 each may be acquired via a serial interface such as, for example, a multi-port serial card (e.g., a PCMCIA card).

Systems 1000 and 1100 are merely illustrative embodiments of a system for obtaining interleaved data from magnetometers and EM sensors. These embodiments are not intended to limit the scope of the invention, as any of numerous other implementations of such a system, for example, variations of systems 1000 and 1100, are possible and are intended to fall within the scope of the invention. For example, although system 1100 illustrates discrete components MPC 1112, SBC 1114 and hardened notebook computer 1116, one or more of these components may be integrated as a single component.

Each of controllers 1010 and 1110 may be adapted to acquire magnetometer data in the "quiet" period (e.g., 1306 in FIG. 13) between EM pulses (e.g., 1304 in FIG. 13), after each EM pulse has decayed. The EM pulses may occur, for example, at seventy-five Hz, resulting in a pulse every 13.3 ms.

Figure 11:
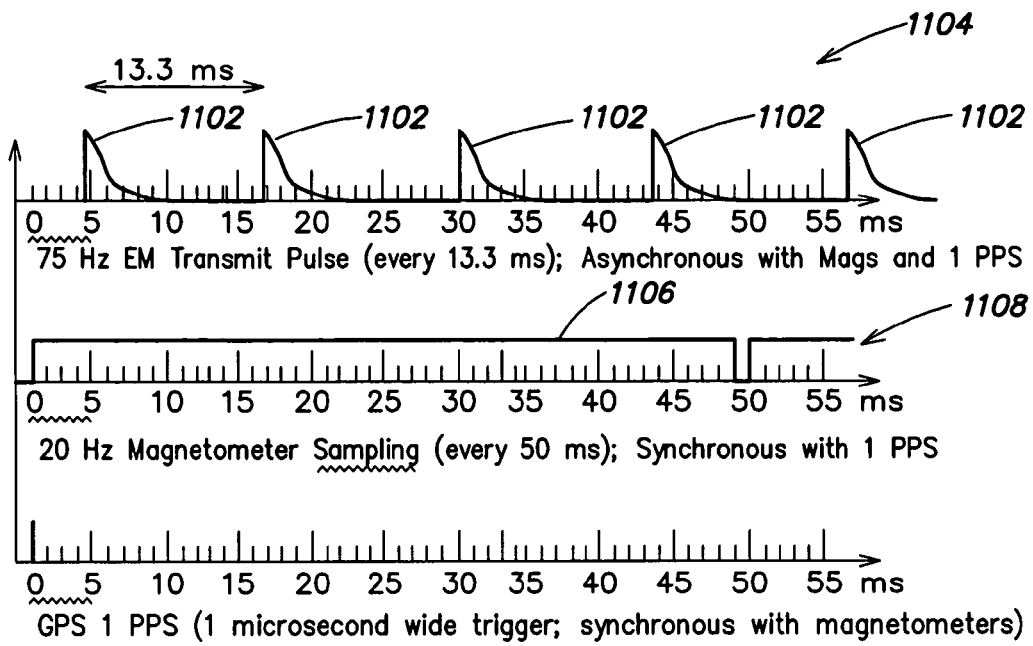
FIG. 11 illustrates a timing diagram of an unsynchronized system that generates EM noise on the magnetometers.

In an unsynchronized system, multiple EM pulses occur while the magnetometer is sampling, and are picked up as noise on the magnetometers. This behavior is depicted in FIG. 11, which illustrates that, in a nominal twenty Hz magnetometer sampling window (e.g., during periods 1106 of signal 1108), an uncertain number of EM pulses (e.g., pulses 1102 of signal 1104) occur within the fifty ms window. These EM pulses are sampled by the system as noise.

In one embodiment, the magnetometer period counter (MPC) board uses the one-PPS signal from the GPS and the seventy-five Hz strobe from the EM master electronics to control the sampling of the magnetometer data. For example, electronics on the MPC board may wait for the one-PPS signal from the GPS, then wait for the first seventy-five Hz strobe signal from the master EM electronics. Once both of these conditions are satisfied, the MPC board may use a pair of programmable counters. The first counter may be used to program the amount of time to wait for the EM pulse to decay. The pulse rate and waiting time may be programmable, so that the EM pulse rate may be other than seventy-five Hz, and the waiting time may be set to longer than or shorter than eight ms, which may be appropriate to allow the EM pulses to completely decay.

Figure 12:
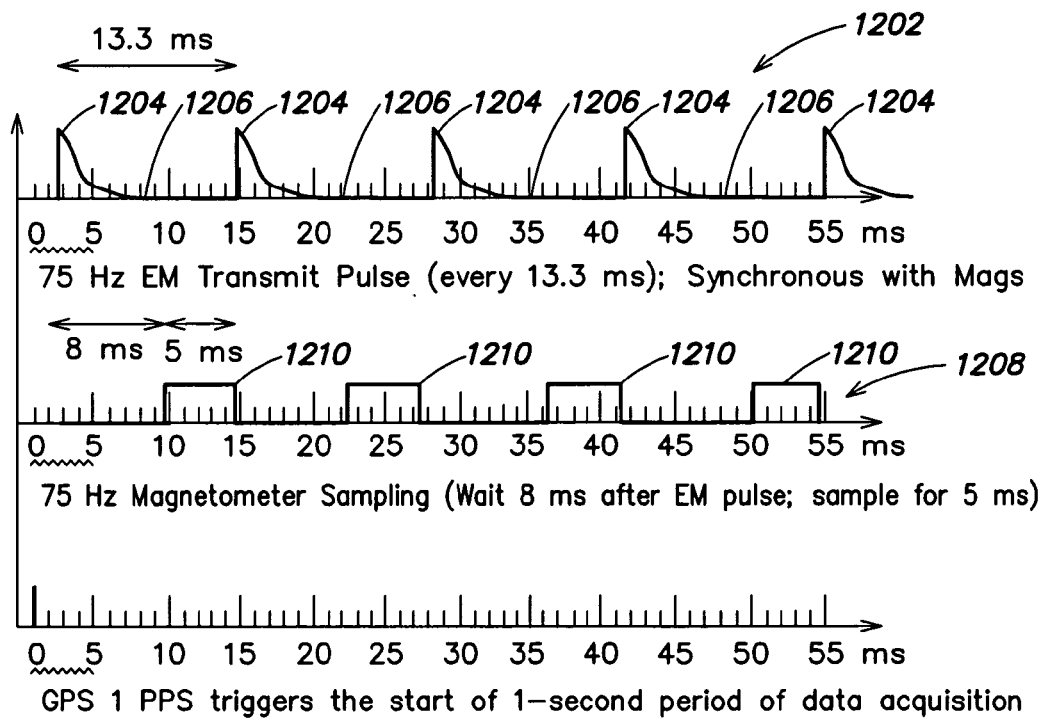
FIG. 12 illustrates one embodiment of a timing diagram according to the present invention, where EM noise is substantially eliminated by sampling the magnetometers only between EM pulses.

The second counter may be used to program the magnetometer's sampling window. For example, a five-ms sampling window may be used. Such synchronous, interleaved sampling is shown in FIG. 12. In this way, magnetometer data may be acquired in a short five-ms sampling window (e.g., during periods 1210 of signal 1208) only after the pulse (e.g., one of pulses 1204 of signal 1202) from the EM that could cause noise has decayed, i.e., when the radiation generated from the EM coils is substantially zero or otherwise negligible (e.g., during periods 1206 of signal 1202) with respect to causing the magnetometers to respond. This synchronous, interleaved design may allow the system to collect high-quality, low-noise magnetometer data while EM sensors are operating in close proximity on a single mount.

It should be appreciated that EM information may be sampled during the decay of EM pulses (as discussed above) and/or between the decay of EM pulses. In some embodiments, EM sampling periods may overlap with magnetometry sampling periods such that at least some EM information and magnetometry information are sampled simultaneously. In other embodiments, the sampling periods do not overlap, such as when EM information is sampled during EM pulse decay and magnetometry information is sampled during the quiet times between EM pulses, as described above.

Accordingly, a vehicular-towed platform having an acquisition system configured to use both magnetometers and EM sensors during a same survey pass (e.g., in an interleaved fashion) may be provided. The system may include a vehicle and a towed platform where both the vehicle and platform are optimized to have low self-signatures for both magnetometer and pulsed EM operation.

As discussed above, magnetometers typically outperform EM sensors for iron or steel objects buried relatively deep underground, while EM sensors typically outperform magnetometers for non-ferrous objects or small objects of all metals buried relatively shallow underground. By having both types of sensors integrated into a single system, the strengths of each type can be exploited.

Figure 13:
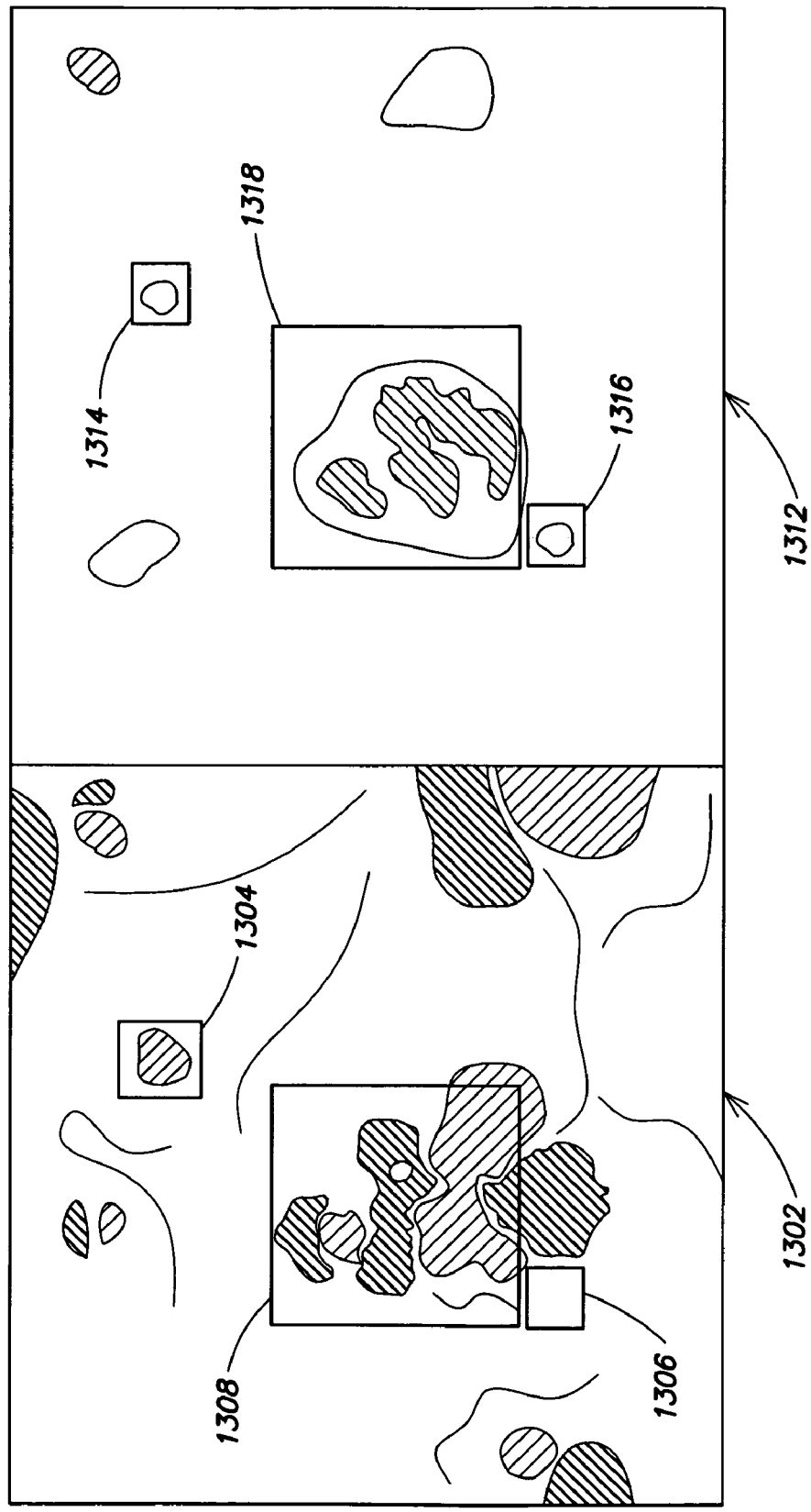
FIG. 13 illustrates magnetometer data and EM data, showing the advantage of a multi-sensor system.
Figure 14:
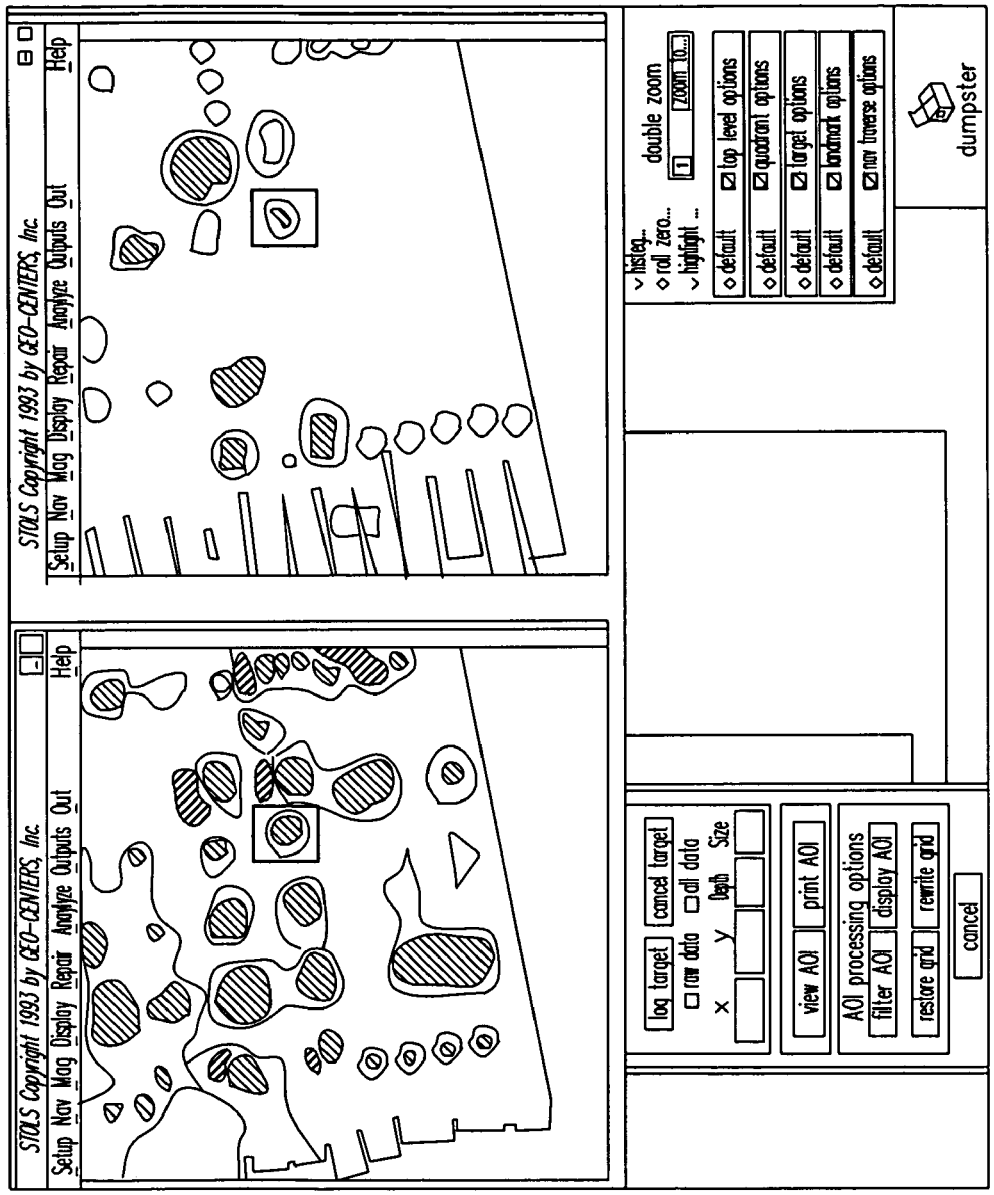
FIG. 14 illustrates one embodiment according to the present invention of a user interface display simultaneously displaying magnetometer data and EM information.

FIG. 13 illustrates magnetometer data and EM data, showing the advantage of the multi-sensor system. In FIG. 13 below, the left image 1302 shows approximately ½ acre of magnetometer data. The right image 1312 shows the same area using the EM sensor. Image 1302 and/or image 1304 may be displayed as part of a user interface display, for example, the user interface display of FIG. 14. In the location within area 1304 of image 1302, the magnetometers clearly detect a medium-sized ferrous object, whereas no such object is visible in the corresponding location within area 1314 of the EM image. Conversely, in the location within area 1316 of image 1312, a small anomaly is clearly visible, whereas no incongruity can be seen in the corresponding location within area 1306 of the magnetometer image 1302. Both of these examples represent cases where objects would not be found if only one of the two sensors had been used. Further, area 1308 in the magnetometer image 1302 shows a complex signature indicative of several objects having superimposed magnetic fields. Such signatures can be difficult to interpret. However, in the corresponding area 1318 in the EM image 1312, a much simpler anomaly pattern is seen showing the presence of several individual objects. This further shows the advantage of concurrently using multiple sensors according to various aspects of the present invention.

One or more software programs may be included to process sensor and location data and simultaneously display the results for viewing. For example, a user interface may provide a user interface display (such as the display of FIG. 14) that simultaneously displays EM and magnetometry data. Such a user interface may be configured to link the display information so that panning and zooming through the magnetometer data will also cause the EM data to pan and zoom, and selecting an area of interest in the magnetometer data will select the same area of interest in the EM data. Processing (e.g., analysis) of magnetometer data may comprise performing a non-linear least squares fit of data in an area of interest to a point-dipole using a modified version of Marquant's method of steepest descent. Extracted dipole parameters are location, depth, angular orientation, and magnetic moment. EM analysis may calculate the depth using the elementary technique of subtracting upper and lower coils. Various linked data processing methods may be included to facilitate incorporation of other feature extraction and information fusion algorithms, as the spatially co-registered magnetometer and EM data inside a region of interest may be available.

Various concepts underlying the present invention may be implemented as part of a method of synchronously interleaving magnetometer data acquisition between EM pulses. Such a method of synchronously interleaved data collection allows deployment of EM sensors and magnetometers on the same platform without engendering the kind of noise normally associated with EM sensors operating in close proximity to magnetometers. Synchronously interleaved data collection may be employed as part of a method (e.g., method 1500 described below in relation to FIG. 15) of determining whether any subsurface objects are present within a region beneath a surface.

Figure 15:
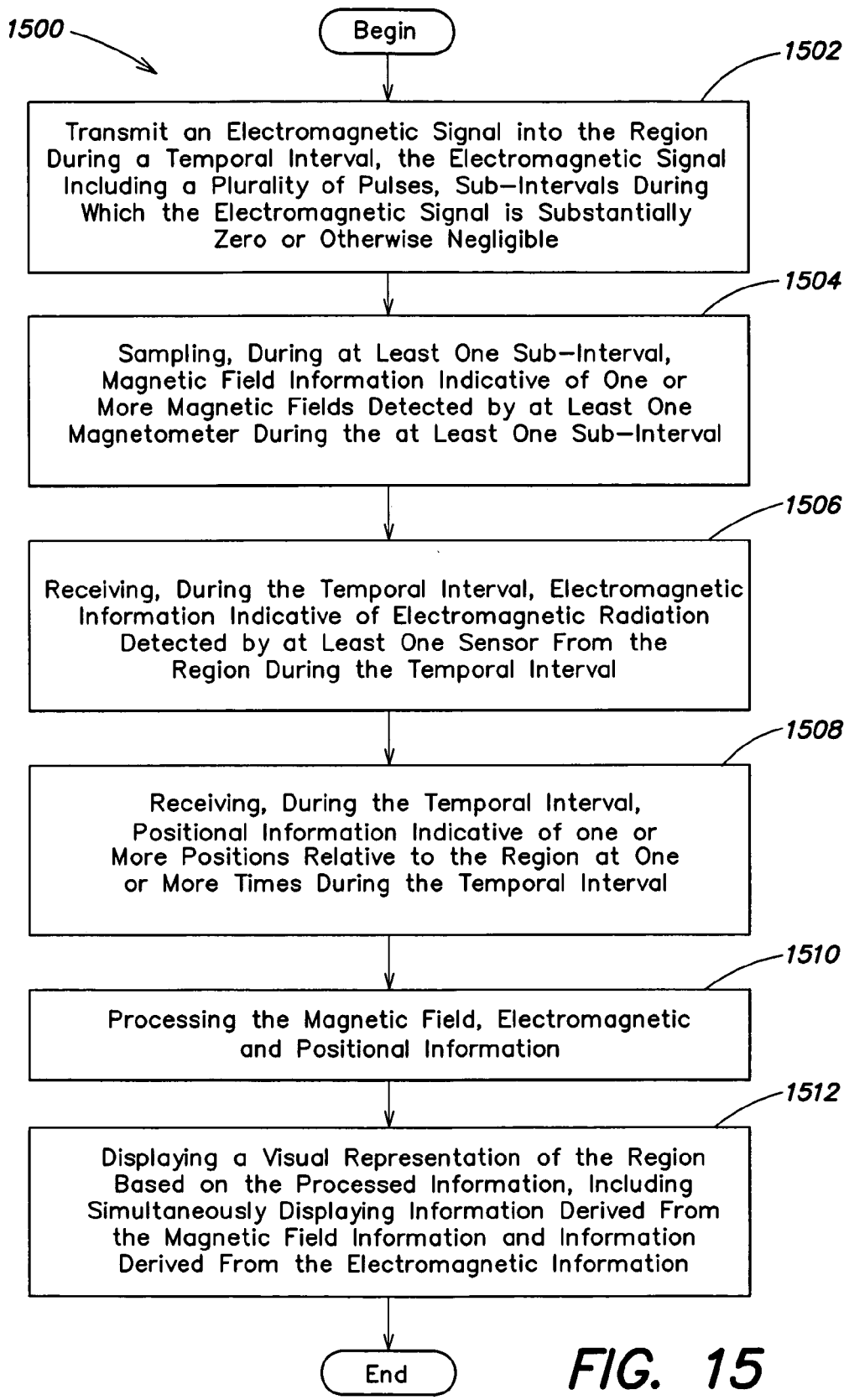
FIG. 15 illustrates one embodiment according to the present invention of a method of determining whether any subsurface objects are present within a region beneath a surface.

FIG. 15 is a flowchart illustrating an example of a method 1500 of determining whether any subsurface objects are present within a region beneath a surface, for example, a surface of the earth. Method 1500 is merely an illustrative embodiment of a method of determining whether any subsurface objects are present within a region beneath a surface, and is not intended to limit the scope of the invention. Any of numerous other implementations of such a method, for example, variations of method 1500, are possible and are intended to fall within the scope of the invention.

In Act 1502, an electromagnetic signal may be transmitted into the region during a temporal interval, for example, by a transmitter of one or more electromagnetic coils (i.e., EM sensors) as described above. The electromagnetic signal may include a plurality of pulses, sub-intervals during which the electromagnetic signal is substantially zero or otherwise negligible, for example, as described above in relation to in FIGS. 9-13.

In Act 1504, magnetic field information may be sampled during at least one sub-interval, for example, as described above in relation to in FIGS. 9-13. The magnetic field information is indicative of one or more magnetic fields detected by at least one magnetometer during the at least one sub-interval. The magnetic field information may be sampled using any of a variety of suitable devices or components thereof, for example, either or controller 1000 or 1000'. The timing of the sampling of the magnetic field information may be synchronized using one or more synchronizing signals, for example, as described above in relation to FIGS. 9-13. For example, the sampling may be synchronized using a synchronizing signal from an electromagnetic sensor (e.g., one of the sensors employed to perform Acts 1502 and/or 1506) and/or a synchronizing signal from a GPS.

In Act 1506, electromagnetic information may be received during the temporal interval, for example, by one or more EM sensors as described above. The electromagnetic information is indicative of electromagnetic radiation detected by at least one sensor from the region during the temporal interval.

In Act 1508, positional information may be received during the temporal interval, for example, from a GPS as described above in relation to in FIGS. 9-13. The positional information is indicative of one or more positions relative to the region at one or more times during the temporal interval.

In Act 1510, the magnetic field information, electromagnetic information and positional information may be processed to glean further information therefrom, for example, using any of the techniques described above.

In Act 1512, a visual representation of the region based on the processed information may be displayed. Displaying the visual representation may include simultaneously displaying information derived from the magnetic field information and information derived from the electromagnetic information, for example, as shown above in FIGS. 5 and 14.

Method 1500 may include additional acts. Further, the order of the acts performed as part of method 1500 is not limited to the order illustrated in FIG. 15, as the acts may be performed in other orders and/or one or more of the acts (e.g., Acts 1502-1508), or at least portions thereof, may be performed in series or in parallel.

Method 1500, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer or processor, instruct the computer or processor to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of any of the systems described above (e.g., in relation to FIGS. 11A-13), and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system that perform any of the functions described above can be generically considered as one or more controllers (e.g., 1000 or 1000') that control the above-discussed functions. The one or more controllers can be implemented in numerous ways, such as with dedicated hardware, or using a processor that is programmed using microcode or software to perform the functions recited above.

Various aspects of the present invention may increase operator safety. For example, performing geophysical surveys for unexploded ordnance typically includes walking over a site carrying sensors, or driving over the site in a small light vehicle with low-pressure tires. Accordingly, there may be inherent risk involved. If the geophysics necessitated a multi-sensor survey of a site to increase the detection, conventional systems would require two separate survey passes to be performed, one survey pass for each sensor. Detection systems employing various aspects of the present invention may require only a single survey pass to collect data from both sensors, halving the time in the field, and thus reducing the operator's exposure.

In addition, performing two separate survey passes—an EM pass and a magnetometry pass—can cost approximately twice as much as performing a single survey pass. In a multi-sensor system as described above, both sensors' data sets are acquired in a single survey pass, keeping the cost the same as for a single-sensor survey, and effectively halving the cost of a multi-sensor survey.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. An on-ground detection system for locating subsurface objects beneath a terrestrial surface using both pulsed electromagnetism and magnetometry, the detection system comprising:
    an on-ground vehicle capable of locomotion on the terrestrial surface; and
    a mount coupled to the vehicle, the mount including at least one electromagnetic coil transmitting pulses of electromagnetic radiation and to detect electromagnetic radiation resulting from the pulses of electromagnetic radiation to obtain first data indicative of whether any subsurface objects are located beneath the surface at a first location, at least one magnetometer detecting magnetic field information to obtain second data indicative of whether any subsurface objects are located beneath the surface at the first location, and a controller interleaving collection of the second data from the at least one magnetometer with the transmission of the pulses of electromagnetic radiation from the at least one electromagnetic coil, the controller processing the first data and the second data to facilitate determining whether any subsurface objects of interest are present at the first location.

2. The detection system of claim 1, wherein the controller synchronizes the collection of data based on at least one of the pulses of electromagnetic radiation and pulses from a global positioning system device, wherein the first location is derived from positional information generated by the global positioning system device.

3. The detection system of claim 1, wherein the controller process the first data and the second data, at least in part, by providing for display, visualization information derived from the first data and the second data.

4. The detection system of claim 1, wherein the at least one magnetometer detects one or more magnetic fields as the at least one magnetometer is moved along the surface at a fixed distance from the at least one electromagnetic coil.

\* \* \* \* \*